Dec. 9, 1969        A. SIEGELMAN ET AL        3,483,410
HIGH TORQUE MOTOR

Filed Nov. 21, 1967                    2 Sheets-Sheet 1

ABE SIEGELMAN
CECIL C. LENCIONI JR
CARL W. ROSMANITH
INVENTORS

BY *A. M. Fernandez*

ATTORNEY

United States Patent Office 3,483,410
Patented Dec. 9, 1969

3,483,410
HIGH TORQUE MOTOR
Abe Siegelman, Morton Grove, Cecil C. Lencioni, Jr., Chicago, and Carl W. Rosmanith, Des Plaines, Ill., assignors to Beckman Instruments, Inc., a corporation of California
Filed Nov. 21, 1967, Ser. No. 684,821
Int. Cl. H02k 33/02, 21/10, 1/06
U.S. Cl. 310—114                                              8 Claims

ABSTRACT OF THE DISCLOSURE

A high torque motor, preferably of the moving iron type, having a pair of axially aligned stators and a rotor in each stator attached to a common shaft, one rotor being angularly displaced, relative to the other rotor by a fixed angle such that when one rotor has its poles directly opposite the pole faces of its associated stator for a maximum gap area the other rotor has its poles offset from the pole faces of its associated stator for a smaller gap area. Coils associated with the stators establish a magnetic field which tends to produce a torque for rotation of the rotor in a given direction in response to an exciting current of one polarity, and in the other direction in response to exciting current of the opposite polarity.

---

This invention relates to a high torque motor and in particular to a high torque motor adapted for use in recorders.

In direct-writing recorders of the type referred to as oscillographic recorders using either D'Arsonval galvanometers or servomotors, a compromise is generally reached between torque and frequency response since more windings required on the rotor to produce greater torque increases the rotor mass and therefore decreases the torque-to-inertia ratio.

High torque pen motors have been designed using a moving iron principle, i.e. a soft iron rotor, a stator with two pole faces each with a coil for producing a flux field and either permanent magnets or separate windings on the stator for bias in an effort to maximize the torque-to-inertia ratio. Such a design also allows the air gap between the rotor and the stator to be reduced to increase the air gap flux density. If used as a galvanometer, a torsion spring returns the rotor to a neutral position when exciting current is removed from the stator coils such that the rotor is aligned with the flux field provided by the permanent magnet or the bias winding. If used as a servomotor, the torsion spring is omitted and a feedback signal is applied to the stator coils to null out the input signal when the rotor has been displaced an amount proportional to the magnitude of the input signal. To accomplish that, some form of a potentiometric, electromagnetic, capacitive or photoelectric position sensing system is attached to the shaft of the rotor.

Although very favorable torque-to-inertia ratios are achieved with a moving iron design for small motors employed in, for example, recorders, it may be shown that the torque is a function of gap area where the gap area is defined generally as the total overlapping area between the pole faces of the stator and the poles of the rotor. For maximum air gap flux density, the stator pole faces should be made no wider than the rotor poles, but then as the rotor is displaced from its neutral position, the gap area (overlap) of the stator pole faces with the rotor poles is immediately decreased. Consequently, torque decreases as the rotor is rotated from its neutral position. In order to achieve more uniform gap area for all positions of the rotor, the pole faces of the stator may be widened to as much as two or three times the width of the rotor poles. However, the flux density of the field produced by the stator would then be reduced and as such, the result would be again a compromise.

An object of this invention is to maximize flux density for a maximum torque-to-inertia ratio and at the same time to maintain a uniform gap area for all positions of the rotor assembly.

A further object of this invention is to provide a torque motor of the type described wherein the torque produced by an exciting signal of a predetermined magnitude is substantially uniform for all positions of the rotor.

Still another object of the invention is to produce a high torque motor of the type described at low cost.

Still another object is to provide an improved high torque motor of the type described with low mass, particularly low rotor mass, for high frequency response.

These and other objects of the invention are achieved in a pen motor of the moving iron type comprising an assembly having two pairs of laminated poles, each with a narrow pole face, and a pair of permanent magnets magnetically coupling the laminated poles such that a pair of axially aligned stators is provided and held in a fixed position relative to each other between end plates. A rotor assembly comprising two axially aligned rotors is journalled between the end plates for rotation about the axis of the stator assembly. Each rotor has a pole having a width approximately equal to the pole-face width of the stator assembly for maximum flux density. The rotors are displaced from each other by a fixed angle such that when one rotor has its poles directly opposite the pole faces of its associated stator for maximum gap area therebetween, the other rotor has its pole displaced from the pole faces of its associated stator for a minimum air gap area therebetween. Excitation coils are wound around the laminated poles of the stator and connected in series, parallel, or series-parallel for single-ended drives, or in series or parallel by pairs for push-pull drive.

The sense of the exciting current for each coil is selected such that excitation of one pair of coils associated with one rotor will tend to reinforce the torque produced by the permanent magnetic field while the excitation of the other pair of coils associated with the other rotor will tend to cancel the torque produced by the permanent magnetic field. In other words, the sense of the exciting current is selected to aid the magnetic flux in one stator while opposing the magnetic flux in the other.

Other objects and advantages of the invention will become apparent from the following description with reference to the drawings in which.

Figure 4:
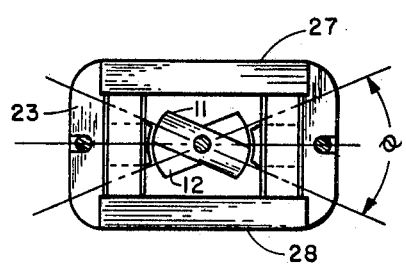
FIGURE 4 is a horizontal section taken on the plane of the line 4—4 shown in FIGURE 3 of the assembly illustrated in FIGURE 1.
Figure 1:
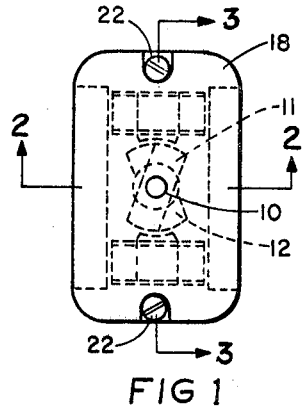
FIGURE 1 is a top plan view of a torque motor assembled in accordance with the concepts of the present invention as an illustrative example.

Referring now to the drawings illustrating a torque motor intended primarily for use in pen recorders where the rotor shaft 10 therefore is affixed to a pen or stylus arm (not shown), it should be understood that although the principles of the present invention are illustrated with reference to a specific embodiment intended primarily for use in pen recorders, and therefore in applications where a limited angle of rotation is required or desired, many other applications may employ the present invention to equal advantage, such as in the actuation of hydraulic valves where again rotation through a limited angle is required, or in the actuation of devices through 360°. Accordingly, in accordance with the principles of the present invention, in an illustrative embodiment, a pair of rotors 11 and 12 are axially aligned and connected to the motor shaft 10 in a manner more clearly illustrated in FIGURES 2 and 3. The bottom of the shaft 10 is connected to a torsion rod 13 which assists in returning the rotors to a neutral position in the absence of an input signal in a manner well known to those who have used a galvanometer type motor. If a servomotor is desired for recording, the torsion rod 13 would be replaced physically and functionally by some position sensing device, such as a sliding contact on a potentiometer, for producing a follow-up or position feedback signal.

The torsion rod 13 is held in place by a housing 14 having a set screw 15 for preventing the torsion rod from turning in place. An end plate 16 supports a bearing 17 for the shaft 10 and the housing 14. An upper end plate 18 supports a bearing 19 at the upper end of the shaft 10. Bolts 22 are employed to secure laminated stator poles 23 and 24 between end plates 16 and 18. Spacers 25 of nonmagnetic material are employed between the laminated poles 23 and 24 and the end plates 18 and 16 as shown in FIGURES 2 and 3.

Figure 3:
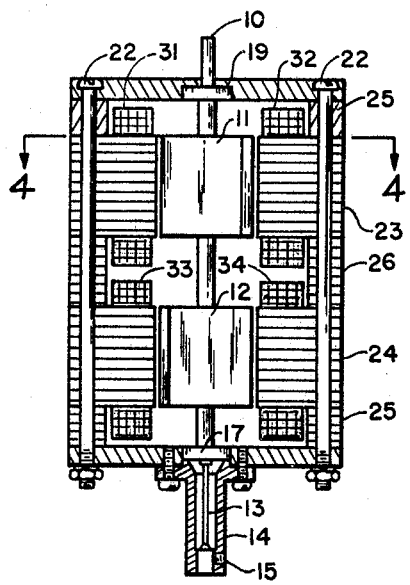
FIGURE 3 is a vertical section taken on the plane of the line 3—3 of the assembly illustrated in FIGURE 1.

A spacer 26 shown in FIGURE 3 is provided between the laminated poles 23 and 24. That spacer is preferably made of laminations from the same material as the laminated poles 23 and 24, in order to provide better flux linkage of both laminated poles 23 and 24 with permanent magnets 27 and 28. Since it is desirable for the end plates 16 and 18 to be magnetically isolated from the stator assemblies in order that magnetic flux not be shunted from the pole faces of the stator assemblies, the bolts 22 are preferably made of nonmagnetic material.

Figure 2:
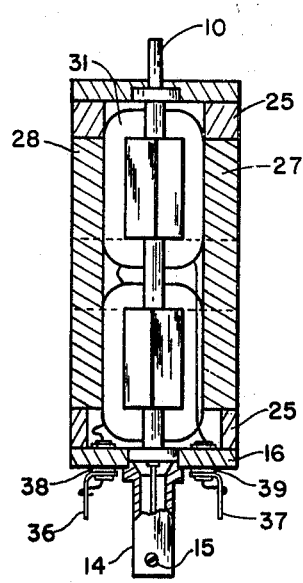
FIGURE 2 is a vertical section taken on the plane of the line 2—2 of the assembly illustrated in FIGURE 1.

The spacers 25 and 26 provide room for coils 31 through 34 to be wound around the stator poles 23 and 24 as shown in FIGURES 2 and 3. The coils associated with the two axially aligned stators are connected in series, parallel, or series parallel as will be described more fully hereinafter with reference to FIGURES 5 to 9 and the ends of the interconnected coils are brought out to terminals 36 and 37 through insulating grommets 38 and 39 as shown in FIGURE 2.

The rotors 11 and 12 are displaced from each other through an angle as more clearly shown in FIGURE 4 such that the total gap area (area of stator pole faces covered by rotor poles) remains constant for all positions of the rotor as the shaft 10 is rotated in response to input signals at terminals 36 and 37 through a maximum angle of rotation equal to the angle by which the rotors are displaced. In that manner, a rotor assembly is provided having a pair of axially aligned rotors 11 and 12 fixedly attached to the shaft 10 journalled for rotation about its axis, one rotor being placed within each stator, that is to say between pole faces of each stator, each rotor having a pair of poles (arcuate ends), the rotors being displaced from each other by a fixed angle such that when one rotor has its poles directly opposite the pole faces of its associated stator for a maximum gap area therebetween, the other rotor has its poles displaced from the pole faces of its associated stator for a minimum gap area.

The stator pole faces (23a, 23b and 24a, 24b shown in FIGURE 5) are preferably of a width equal to the width of the rotor poles in order to provide maximum flux density between the pole faces, as noted hereinbefore, but may be made larger without losing all of the advantages of the present invention should a larger angle of rotation be desired for the shaft 10. Alternatively, the rotor poles 11 and 12 may be made wider for the same purpose, without losing all of the advantages. However, to do so would result in a decrease of the torque-to-inertia ratio which in the preferred embodiment illustrated is maximized. Another alternative would be to vary the angle by which the rotors are displaced, but rather than resort to any of these alternatives, it would be preferable to add one or more rotor and stator assemblies axially aligned with the two illustrated, but with the rotors displaced from the other rotors by the angle $\theta$ where the angle $\theta$ is defined in radians as that angle subtended by the arc of the pole faces of the stators when the pole faces have a curvature with a radius measured from the axis of the shaft 10 to the pole faces. Thus a multiplicity of rotor assemblies with a number of pairs of field coils equal to the number of rotor assemblies may be employed for a torque motor having a greater angle of rotation. In such a device the current to successive coils may be commutated for either stepwise rotation or continuous rotation.

In its broadest aspects, the present invention consists of two stator and rotor assemblies axially aligned, but otherwise independent of each other such that the stator pole faces may be displaced from each other, although for simplicity and ease in manufacture it is preferable to have the pole faces of both stators in line, and the stators displaced from each other such that when one rotor has its poles directly opposite the pole faces of its associated stator for a maximum gap area, the other rotor has its poles displaced from the pole faces of its associated stator for a minimum gap area, but if the stator pole faces are not aligned, only the effective angle of displacement of the rotors will be equal to the angle defined in radians by the arc of the pole faces. Thus, if the pole faces of the stators are displaced by an angle $\phi$, the rotors should then be displaced by the sum of that angle $\phi$ and the angle $\theta$. However, electromagnetically, the angle of displacement of the rotors remains equal to the angle $\theta$ and not the sum $\phi+\theta$.

As noted hereinbefore, it can be shown that torque is directly proportional to the rotor radius and the gap area. Gap area is in turn proportional to the rotor length and the overlap in radians of a pole face with a rotor pole for any position of the rotor. By maintaining the gap area constant in accordance with the present invention, uniform maximum torque is provided for all positions of the shaft 10 within the limits of rotation equal to the angle $\theta$.

Figure 5:
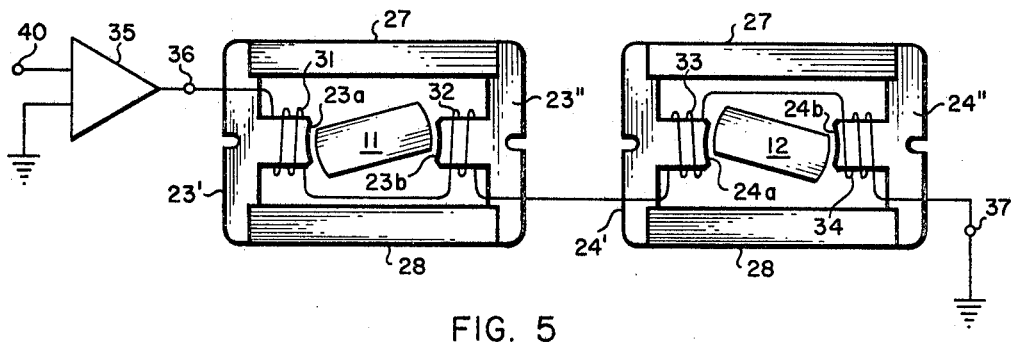
FIGURE 5 illustrates a schematic diagram of a single-ended drive amplifier connected to coils shown in FIGURE 3.
Figure 6:
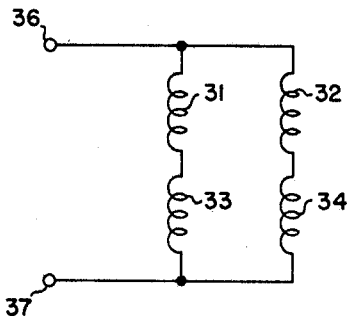
FIGURES 6 and 7 illustrate alternative ways of making coil connections to the drive amplifier of FIGURE 5.
Figure 7:
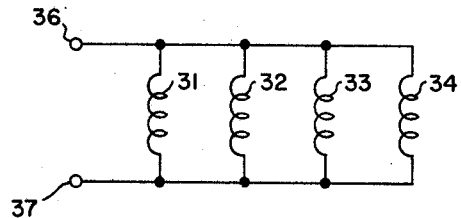

FIGURE 5 illustrates the manner in which the coils 31 through 34 may be connected in series to the output of an amplifier 35 operating in a push-pull manner from a single signal source (not shown) connected to input terminal 40. If only the upper coil 31 is excited by an input signal the magnetic field in the air gap between the rotor 11 and the stationary pole 23' about which the coil 31 is wound will cause the rotor 11 to move against the constraint of the torsion rod 13 in a direction which will depend upon whether flux aids or opposes the magnetic flux between the pole faces 23a and 23b provided by the permanent magnets 27 and 28. It should be noted that the function of the permanent magnets may, for example, be provided by a bias winding around each pole, or by other equivalent means for establishing a permanent magnetic field. Current through the coil 32 will aid or oppose the magnetic flux between the pole faces 23a and 23b in the same manner as the same current through the coil 31. The coils 33 and 34 are similarly wound with respect to each other, but so wound with respect to the coils 33 and 34 that the same current through all four coils will cause the energized coils 31 and 32 to aid the flux provided between the pole faces 23a and 23b by the permanent magnets 27 and 28, while it will cause the energized coils 33 and 34 to oppose the flux provided between the pole faces 24a and 24b. If the direction of the current is reversed the coils 31 and 32 will oppose and the coils 33 and 34 will aid. In the latter case the direction of rotation of the rotors 11 and 12 is counterclockwise and in the former case clockwise. In both cases the angle of rotation produced against the torsion rod 13 is proportional to the amplitude of the input current. Thus, if the appropriate electrical interconnection of these coils is made either in series as shown in FIGURE 5, in series-parallel as shown in FIGURE 6 or in parallel as shown in FIGURE 7, simultaneous current excitation of the coils will produce rotation of the rotor either clockwise or counterclockwise depending upon the polarity of the exciting current. The angle of rotation against the constraint of the torsion rod 13 will then depend upon the amplitude of the exciting current.

Figure 8:
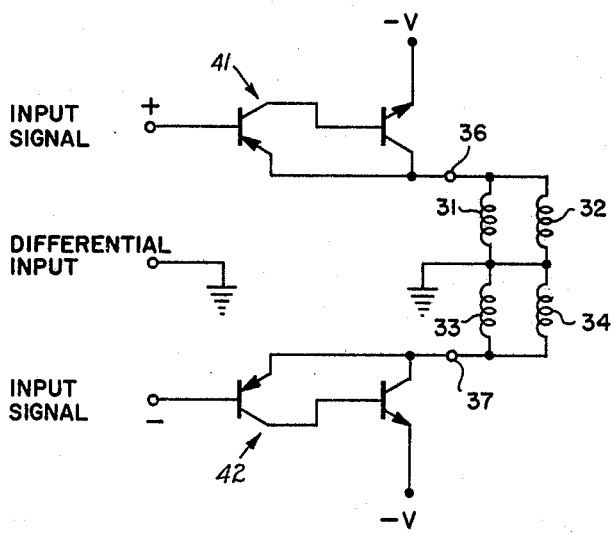
FIGURE 8 illustrates a schematic diagram of a push-pull amplifier connected to coils shown in FIGURE 3.
Figure 9:
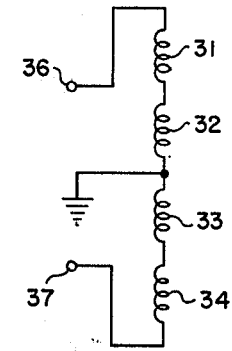
FIGURE 9 illustrates an alternative way of making coil connections to the push-pull amplifier illustrated in FIGURE 8.

FIGURE 8 illustrates the manner in which a pair of amplifiers 41 and 42 may be employed in a push-pull manner to excite the coils from differential input signals. The sense of each winding is selected in a manner analogous to that described with reference to FIGURES 5 through 7.

It should be noted that this invention may be used with either D.C. or A.C. exciting signals, but at certain A.C. frequencies it may be desirable to use a laminated iron structure for the rotors as well as the stators whereas for D.C. and lower A.C. frequencies, not only may the rotor be made of solid iron as illustrated, but also the stators.

Although the present invention has been shown and described with reference to particular embodiments, it should be apparent to one skilled in the art that many changes and modifications may be made without departing from the spirit and scope of the present invention. For instance, although a magnetic spacer 26 has been shown, it should be understood that the laminated poles 23 and 24 may be isolated by a nonmagnetic spacer such that separate biasing magnets are provided, one for each stator assembly. In that manner the stator assemblies may be rearranged in some other configuration, and not axially in line with each other, provided only that the relative positions of their associated rotors are maintained.

What is claimed is:

1. In a high torque motor
    a stator assembly comprising a pair of axially aligned stators fixedly attached to each other, said stators being mechanically in phase and each stator having a pair of opposing pole faces disposed about a center line common to both,
    a rotor assembly comprising a pair of axially aligned rotors fixedly attached to a common shaft journalled for rotation about said axis, each rotor being placed between the opposing pole faces of one stator only, and each rotor having a pair of poles, the poles of said rotors being angularly displaced from each other by a fixed angle such that when one rotor has its poles directly opposite the pole faces of its associated stator for a maximum gap area therebetween, the other rotor has its poles displaced from the pole faces of its associated stator for a minimum gap area therebetween,
    and at least one pair of coils, one for each of the associated rotors and stators for establishing a magnetic field therebetween, the sense of the windings in the coils tending to produce a torque for rotation of the rotor in the same direction in response to exciting current signals applied to both coils.

2. In a high torque motor, the combination as defined in claim 1 wherein said coils are wound around said stators.

3. In a high torque motor, the combination as defined in claim 2 having four coils, one for each pole face of said stator.

4. In a high torque motor, the combination as defined in claim 2 wherein each of said stators comprises a permanent magnet.

5. In a high torque motor, the combination as defined in claim 4 wherein said stators are formed of a single permanent magnet.

6. In a high torque motor, the combination as defined in claim 1 wherein said stator pole is of a selected width, and said stator pole faces are of approximately the same width.

7. In a high torque motor
    a stator assembly comprising a pair of axially aligned stators fixedly attached to each other, each stator having a pair of opposing pole faces disposed about a center line common to both,
    a rotor assembly comprising a pair of axially aligned rotors fixedly attached to a common shaft journalled for rotation about said axis, one rotor being placed between pole faces of each stator, and each rotor having a pair of poles, the poles of said rotors being angularly displaced from each other by a fixed angle such that when one rotor has its poles directly opposite the pole faces of its associated stator for a maximum gap area therebetween, the other rotor has its poles displaced from the pole faces of its associated stator for a minimum gap area therebetween.
    at least one pair of coils, one for each of the associated rotors and stators for establishing a magnetic field therebetween, the sense of the windings in the coils tending to produce a torque for rotation of the rotor in the same direction in response to exciting current signals applied to both coils, and
    a torsion rod connected to one end of said shaft and a housing disposed about said torsion rod and fixedly attached to said stator whereby said torsion rod returns said rotor to a neutral position in the absence of any exciting current, said neutral position being such that each rotor has its poles so placed opposite pole faces of the stator that the gap area of one is equal to the gap area of the other.

8. In a high torque motor
    a stator assembly comprising a pair of axially aligned stators fixedly attached to each other, each stator having a pair of opposing pole faces disposed about a center line common to both, the width of the stator pole faces being substantially equal, said width being selected to be of the same shape and width as an arc defined in radians substantially equal to the fixed angle by which said rotors are displaced from each other also defined in radians, and the pole faces have a curvature with a radius measured from the axis of said shaft,
    a rotor assembly comprising a pair of axially aligned rotors fixedly attached to a common shaft journalled for rotation about said axis, one rotor being placed between pole faces of each stator, and each rotor having a pair of poles, the poles of said rotors being angularly displaced from each other by a fixed angle such that when one rotor has its poles directly opposite the pole faces of its associated stator for a maximum gap area therebetween, the other rotor has its poles displaced from the pole faces of its associated stator for a minimum gap area therebetween,
    and at least one pair of coils, one for each of the associated rotors and stators for establishing a magnetic field therebetween, the sense of the windings in the coils tending to produce a torque for rotation of the rotor in the same direction in response to exciting current signals applied to both coils.

References Cited

UNITED STATES PATENTS

| | | | |
|---|---|---|---|
| 3,082,336 | 3/1963 | Poole | 310—41 |
| 3,171,049 | 2/1965 | Jarret | 310—114 |
| 3,173,042 | 3/1965 | Fodor | 310—114 |
| 3,403,313 | 9/1968 | Pansini | 310—114 |

WARREN E. RAY, Primary Examiner

R. SKUDY, Assistant Examiner

U.S. Cl. X.R.

310—41, 154, 181, 36